(12) United States Patent
Yoshimura et al.

(10) Patent No.: US 9,023,537 B2
(45) Date of Patent: May 5, 2015

(54) BATTERY

(75) Inventors: Kentaro Yoshimura, Fukushima (JP); Toru Odani, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 13/081,098

(22) Filed: Apr. 6, 2011

(65) Prior Publication Data

US 2011/0250507 A1 Oct. 13, 2011

(30) Foreign Application Priority Data

Apr. 9, 2010 (JP) .................................. 2010-090272

(51) Int. Cl.
| | | |
|---|---|---|
| *H01M 10/056* | (2010.01) | |
| *H01M 4/62* | (2006.01) | |
| *H01M 4/131* | (2010.01) | |
| *H01M 10/0525* | (2010.01) | |
| *H01M 10/0567* | (2010.01) | |
| *H01M 10/42* | (2006.01) | |
| *H01M 4/133* | (2010.01) | |

(52) U.S. Cl.
CPC ................ *H01M 4/62* (2013.01); *H01M 4/131* (2013.01); *H01M 4/133* (2013.01); *H01M 10/0525* (2013.01); *H01M 10/0567* (2013.01); *H01M 10/4235* (2013.01); *H01M 2300/0042* (2013.01); *Y02E 60/122* (2013.01)

(58) Field of Classification Search
CPC ... H01M 4/131; H01M 4/62; H01M 10/0567; H01M 10/4235; H01M 10/0525; H01M 4/133; H01M 2300/0042; Y02E 60/122
USPC .................... 429/338, 232, 218.1, 231.6, 188
See application file for complete search history.

(56) References Cited

U.S. PATENT DOCUMENTS

| | | | |
|---|---|---|---|
| 5,427,875 A | | 6/1995 | Yamamoto et al. |
| 5,567,539 A | * | 10/1996 | Takahashi et al. ............. 429/57 |
| 5,962,167 A | * | 10/1999 | Nakai et al. ................ 429/231.1 |
| 6,365,299 B1 | | 4/2002 | Miyaki et al. |
| 6,436,574 B1 | | 8/2002 | Numata et al. |
| 7,105,251 B2 | | 9/2006 | Miyaki et al. |
| 7,718,322 B2 | | 5/2010 | Lee et al. |
| 2005/0037134 A1 | * | 2/2005 | Liu et al. ......................... 427/58 |
| 2008/0286657 A1 | * | 11/2008 | Hasegawa et al. ............ 429/338 |
| 2009/0011333 A1 | | 1/2009 | Wakita et al. |

FOREIGN PATENT DOCUMENTS

| | | |
|---|---|---|
| JP | 08-102331 | 4/1996 |
| JP | 10-097873 | 4/1998 |
| JP | 10-106541 | 4/1998 |
| JP | 2000-195517 | 7/2000 |
| JP | 3103899 | 10/2000 |
| JP | 2000-311675 | 11/2000 |
| JP | 2000-311689 | 11/2000 |
| JP | 3172388 | 6/2001 |
| JP | 3197763 | 8/2001 |
| JP | 2001-307773 | 11/2001 |

(Continued)

*Primary Examiner* — Milton I Cano
*Assistant Examiner* — Ling R Zeng
(74) *Attorney, Agent, or Firm* — K&L Gates LLP

(57) ABSTRACT

A positive electrode includes: a positive electrode collector; and a positive electrode active material layer provided on the positive electrode collector and containing a positive electrode active material and an alkaline earth metal carbonate having a fixed form.

7 Claims, 5 Drawing Sheets

(56) References Cited

FOREIGN PATENT DOCUMENTS

| | | |
|---|---|---|
| JP | 3281701 | 5/2002 |
| JP | 2002-270181 | 9/2002 |
| JP | 3562187 | 9/2004 |
| JP | 2005-072003 | 3/2005 |
| JP | 2007-026959 | 2/2007 |
| JP | 2007-103134 | 4/2007 |
| JP | 2008-103344 | 5/2008 |
| JP | 2008-103345 | 5/2008 |
| JP | 2009-016245 | 1/2009 |
| WO | 97-01870 | 9/1998 |

* cited by examiner

BATTERY

CROSS REFERENCES TO RELATED APPLICATIONS

The present application claims priority to Japanese Priority Patent Application JP 2010-090272 filed in the Japan Patent Office on Apr. 9, 2010, the entire contents of which is hereby incorporated by reference.

BACKGROUND

The present application relates to a battery using a positive electrode active material containing an alkali metal inclusive of lithium (Li) and an alkaline earth metal and to a positive electrode to be used for the battery.

Owing to the remarkable development of a portable electronic technology in recent years, electronic appliances such as mobile phones and laptop personal computers have started to be recognized as a basic technology supporting a high-level information society. Also, research and development on high functionalization of such an electronic appliance are energetically advanced, and the consumed electric power of such an electronic appliance increases steadily in proportion thereto. On the contrary, such an electronic appliance is to be driven over a long period of time, and realization of a high energy density of a secondary battery that is a drive power source has been inevitably desired. Also, in view of consideration of the environment, the prolongation of a cycle life has been desired.

From the viewpoints of occupied volume and mass of a battery to be built in an electronic appliance, it is desirable that the energy density of the battery is as high as possible. At present, in view of the fact that a lithium ion secondary battery has an excellent energy density, the lithium ion secondary battery is now built in almost all of appliances.

Usually, the lithium ion secondary battery uses lithium cobaltate for a positive electrode and a carbon material for a negative electrode, respectively and is used at an operating voltage in the range of from 4.2 V to 2.5 V. The fact that in a single cell, a terminal voltage can be increased to 4.2 V largely relies upon excellent electrochemical stability of a nonaqueous electrolyte material or a separator or the like.

For the purposes of realizing higher functionalization and enlarging applications on such a lithium ion secondary battery, a number of investigations are being advanced. As one of them, for example, it is studied to contrive to realize a high capacity of a lithium ion secondary battery by enhancing an energy density of a positive electrode active material inclusive of lithium cobaltate.

However, in the case of repeating charge and discharge at a high capacity, in particular, in a high-temperature region, a nonaqueous electrolyte coming into physical contact with a positive electrode is oxidatively decomposed, and a gas is generated to cause defectives such as blister, rupture, liquid leakage and the like of the battery. Also, a transition metal contained in the active material elutes into the nonaqueous electrolyte and is deposited on a negative electrode, thereby causing a fine internal short circuit; and therefore, there were caused such a problem that not only the safety is remarkably impaired, but deterioration of the capacity occurs, so that a battery life is shortened.

Then, a method in which a positive electrode active material is modified, thereby enhancing its chemical stability, suppressing elution of a transition metal into a nonaqueous electrolyte or the like and improving battery characteristics is investigated. Alternatively, a method in which a compound having a special function imparted thereto is added in a nonaqueous electrolyte, thereby forming a minute coating on either one of a positive electrode or a negative electrode or both of them and preventing deterioration of a battery capacity especially at a high temperature is widely adopted.

For example, Patent Document 1 (Japanese Patent No. 3172388) discloses a method in which a metal oxide is coated on the surface of a positive electrode, thereby improving a cycle characteristic. Also, Patent Document 2 (JP-A-2000-195517) discloses a method in which a metal oxide coating is formed on the surface of a positive electrode active material, thereby suppressing elution of a transition metal into a nonaqueous electrolyte and enhancing a battery life.

Patent Document 3 (JP-A-2002-270181) reports that when a phthalimide compound is incorporated into an electrode, and the compound having been dissolved in a nonaqueous electrolyte is adsorbed onto a positive electrode or a negative electrode, an effect for suppressing elution of a transition metal is obtained in the positive electrode, whereas deposition of the eluted metal is prevented in the negative electrode, whereby battery characteristics at a high temperature are improved. Also, Patent Document 4 (JP-A-2005-72003) reports that the addition of a nitrile derivative improves battery characteristics. At the same time, Patent Document 4 reports that in the case of using a mixed solvent such as a mixture of a cyclic or chain ester and a lactone, battery blister at the time of high-temperature storage can be suppressed.

In addition to the foregoing technologies, Patent Document 5 (Japanese Patent No. 3281701) reports that by adding calcium carbonate to a nonaqueous electrolytic solution, a free acid is removed in the electrolytic solution, so that battery characteristics are enhanced. Also, Patent Document 6 (Japanese Patent No. 3197763) reports that the addition of from 0.1% by mole to 20% by mole of a salt, hydroxide or carbonate of a transition metal such as manganese, cobalt and nickel, a typical metal such as aluminum and zinc, or sodium, magnesium or calcium to a positive electrode impairs a catalytic activity of a positive electrode material contributing to decomposition of an electrolytic solution, thereby enhancing storage characteristics of a battery.

SUMMARY

However, in the case of merely stabilizing the transition metal oxide contained in the positive electrode active material as described in the foregoing Patent Documents 1 and 2, the transition metal having once eluted from the positive electrode entirely accumulates onto a separator or deposits on the negative electrode, and though it may be possible to contrive to improve deterioration of the capacity, the effect is still insufficient. Also, since the surface of the positive electrode in a highly oxidized state in the charged state sufficiently maintains the activity, there was involved such a problem that the generation of a gas due to decomposition of the nonaqueous electrolyte or separator coming into physical contact with the surface of the positive electrode is large.

Also, in the case of adding a specified compound in the nonaqueous electrolyte as described in the Patent Documents 3 and 4, in particular, under a high voltage at which an open circuit voltage is higher than 4.2 V, there is often the case where the effect is not obtained because of the fact that its action reversely works as a trigger, whereby the transition metal vigorously elutes from the positive electrode. Also, a number of nitrogen-containing compounds are reductively decomposed on the side of the negative electrode, leading to cycle deterioration, and therefore, such is not preferable.

In the case where it is intended to suppress the amount of a free acid in the electrolytic solution with calcium carbonate added in the nonaqueous electrolytic solution as described in the Patent Document 5, the calcium carbonate precipitates and exists in the inside of the battery, and the desired neutralization reaction becomes a solid-liquid reaction, so that the effects are not substantially obtained. The Patent Document 6 describes that the catalytic activity of the positive electrode active material contributing to decomposition of the electrolytic solution can be suppressed by adding a chloride, oxalate, acetate or carbonate of potassium, sodium or magnesium in the addition to the transition metal or typical metal. However, there is an example in which the generation of a gas is rather accelerated at the high-temperature storage, and the effect is not certain.

In the light of the above, as for a method of enhancing the stability of a positive electrode active material in a nonaqueous electrolyte upon modification, or a technique of preventing the deterioration of a battery due to a function of a compound added to a nonaqueous electrolyte, elucidation of the mechanism or effect is still indefinite and often insufficient.

Also, in the case of combining the foregoing technologies, though a higher effect could be expected from the viewpoint of improving battery characteristics, as a result of actual investigations, there was often seen the case where the positive electrode is reversely eroded, or an impedance in the inside of the battery increases, thereby impairing the battery characteristics. In particular, in batteries in which the voltage after charge is set to 4.25 V or more, adverse influences were remarkable.

Thus, it is desirable to provide a secondary battery having an enhanced charge and discharge efficiency, an excellent cycle characteristic and a high energy density.

According to one embodiment, there is provided a positive electrode including a positive electrode collector and a positive electrode active material layer provided on the positive electrode collector and containing a positive electrode active material and an alkaline earth metal carbonate having a fixed form.

Also, according to another embodiment, there is provided a nonaqueous electrolyte secondary battery including a positive electrode including a positive electrode collector and a positive electrode active material layer provided on the positive electrode collector and containing a positive electrode active material and an alkaline earth metal carbonate having a fixed form; a negative electrode; a nonaqueous electrolyte; and a separator.

In the embodiments of the present application, it is preferable that the alkaline earth metal carbonate has at least one shape selected from the group consisting of a cubic shape, a rectangular parallelepipedal shape, a spindle shape, a spherical shape and a flaky shape.

According to the embodiments of the present application, corrosion and deterioration of the positive electrode can be suppressed without lowering workability of the positive electrode active material layer.

According to the embodiments of the present application, not only high workability of the electrode but high battery characteristics can be obtained.

Additional features and advantages are described herein, and will be apparent from the following Detailed Description and the figures.

DETAILED DESCRIPTION

Embodiments of the present application will be described below in detail with reference to the drawings.

1. First embodiment (an example of a positive electrode containing a carbonate according to an application of the present application)

2. Second embodiment (an example using a cylindrical type nonaqueous electrolyte battery)

3. Third embodiment (an example using a laminated film type nonaqueous electrolyte battery)

1. First Embodiment

In a first embodiment according to the present application, a positive electrode according to an application of the present application is described.

(1-1) Configuration of Positive Electrode

Figure 1:
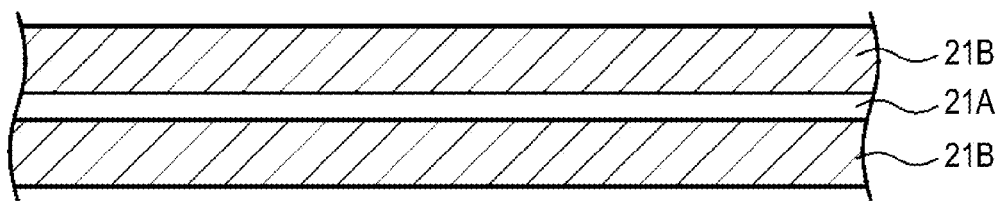
FIG. 1 is a sectional view showing a configuration of a positive electrode according to an embodiment.

FIG. 1 is a sectional view showing a configuration example of a positive electrode 21 according to the first embodiment. The positive electrode 21 has, for example, a structure in which a positive electrode active material layer 21B is provided on the both surfaces of a positive electrode collector 21A having a pair of surfaces opposing to each other. While illustration is omitted, the positive electrode active material layer 21B may be provided on only one surface of the positive electrode collector 21A. The positive electrode collector 21A is, for example, constituted of a metal foil such as an aluminum foil. The positive electrode active material layer 21B is constituted such that it contains, as a positive electrode active material, one or two or more kinds of a positive electrode material capable of intercalating and deintercalating lithium and further contains a conductive agent such as graphite and a binder such as polyvinylidene fluoride, if desired.

[Alkaline Earth Metal Carbonate Having a Fixed Form]

The positive electrode 21 according to the first embodiment contains an alkaline earth metal carbonate having a fixed form as well as a positive electrode active material. It is preferable that the fixed form that the carbonate has is at least one shape selected from the group consisting of a cubic shape, a rectangular parallelepipedal shape, a spindle shape, a spherical shape and a flaky shape.

The alkaline earth metal carbonate having a fixed form refers to a carbonate of an alkaline earth metal having a fixed form, and it is meant by the terms "having a fixed form" that the alkaline earth metal carbonate has a fixed form.

By incorporating the alkaline earth metal carbonate into the positive electrode, the alkaline earth metal carbonate reacts with an electrolytic solution before the positive electrode active material on the positive electrode surface. That is, on the occasion of producing acidic activity, the alkaline earth metal carbonate causes a neutralization reaction at the interface with the positive electrode active material, thereby enabling deterioration of the positive electrode active material to be suppressed. Also, for example, in comparison with the case of using an alkali metal salt, in the case of using the alkaline earth metal carbonate according to the first embodiment, a neutralization speed is slow in an oxidative environment, so that a neutralization effect continues for a long time. Therefore, such is preferable.

Also, in view of the fact that the carbonate has a fixed form, in an electrode manufacturing step that is one of important steps at the time of manufacturing a battery, it is possible to form an electrode by the addition of a coating material without impairing coating material properties such as dispersibility of solids, filling properties of an active material, or pressing characteristics. Though this primary factor has not been explicitly elucidated yet, there may be a possibility that the carbonate having a fixed form functions as a filler for enhancing slipperiness among particles and the like.

Figure 2:
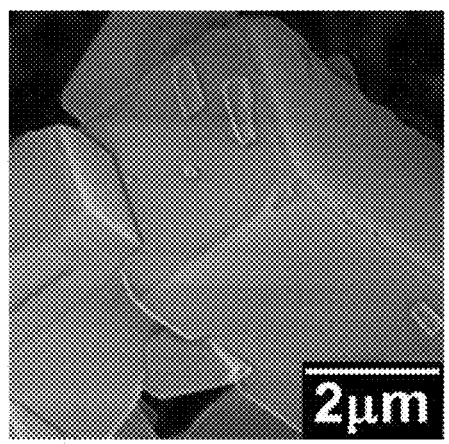
FIG. 2 is a scanning electron microscopic photograph of an alkaline earth metal carbonate according to an embodiment.
Figure 3:
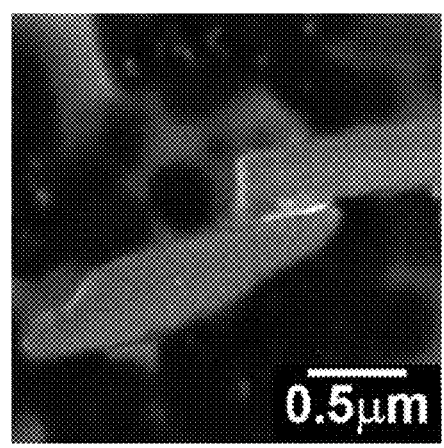
FIG. 3 is a scanning electron microscopic photograph of an alkaline earth metal carbonate according to an embodiment.

As for the alkaline earth metal carbonate, its shape can be confirmed through observation by a scanning electron microscope (SEM) or the like. Also, its particle size can be measured by a scanning electron microscope (SEM) or the like. For example, when the particle shape is a rectangular parallelepipedal shape, a longitudinal direction thereof refers to the long side. For example, as for the alkaline earth metal carbonate according to the first embodiment, one shown in FIG. 2 can be confirmed as an example of a cubic or rectangular parallelepipedal shape by a scanning electron microscope; and one shown in FIG. 3 can be confirmed as an example of a spindle shape by a scanning electron microscope.

Figure 4:
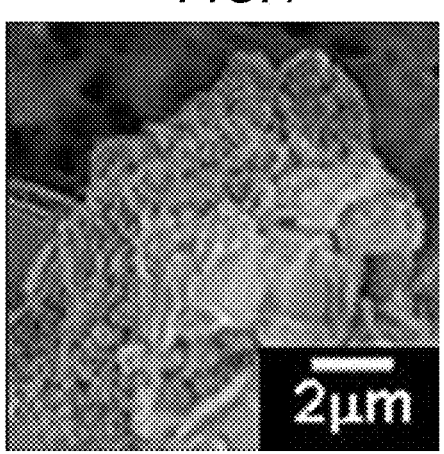
FIG. 4 is a scanning electron microscopic photograph of an alkaline earth metal carbonate which does not fall within an embodiment.

Meanwhile, FIG. 4 shows a shape of an amorphous alkaline earth metal carbonate that is confirmed by a scanning electron microscope. The shape of the alkaline earth metal carbonate can be easily confirmed through observation by a scanning electron microscope.

As for the carbonate according to the first embodiment, a primary particle size in the longitudinal direction is preferably 0.01 µm or more and not more than 5.0 µm, and more preferably 0.01 µm or more and not more than 3.0 µm. When the primary particle size is smaller than the foregoing range, it is difficult for the carbonate to keep the fixed form. That is, a carbonate having a primary particle size smaller than the foregoing range becomes amorphous from the standpoint of manufacture. Also, when the carbonate is amorphous, it does not have a primary particle size. Also, where the primary particle size is larger than the foregoing range, workability of a positive electrode mixture is lowered.

Also, as for the carbonate according to the first embodiment, a specific surface area as determined by the BET method is preferably 2.0 m²/g or more, and more preferably 5 m²/g or more. When the specific surface area is small within the foregoing range, an area coming into contact with a positive electrode mixture becomes large, so that workability of the positive electrode mixture is lowered. When the specific surface area is smaller than the foregoing range, it is difficult for the carbonate to keep the fixed form.

A content of the carbonate according to the first embodiment is preferably 0.01% by weight or more and not more than 10% by weight in the positive electrode active material layer. When the content of the carbonate falls within the foregoing range, a neutralization effect to be brought by the addition is sufficiently obtainable; and blister of the battery to be caused due to the generation of a gas or a malfunction of a current breaking mechanism given previously to the battery does not occur.

Furthermore, the carbonate may be one having been subjected to a surface treatment with a silane coupling agent, rhodinic acid, a fatty acid, a quaternary ammonium salt or the like. By performing the surface treatment, aggregation among the carbonates is suppressed, whereby dispersibility in a positive electrode mixture layer is enhanced.

[Positive Electrode Active Material]

The positive electrode material capable of intercalating and deintercalating lithium includes a lithium complex oxide having a structure of a layered rock salt type expressed by an average composition represented by the following formula (1). This is because such a lithium complex oxide is able to enhance the energy density.

$$Li_{i1}Co_{(1-i2)}M1_{i2}O_{(2-i3)}F_{i4} \quad (1)$$

In the formula (1), M1 represents at least one member selected from the group consisting of nickel, manganese, magnesium, aluminum, boron, titanium, vanadium, chromium, iron, copper, zinc, molybdenum, tin, calcium, strontium and tungsten; and i1, i2, i3 and i4 represent values falling within the ranges of $0.8 \leq i1 \leq 1.2$, $0 \leq i2 < 0.5$, $-0.1 \leq i3 \leq 0.2$ and $0 \leq i4 \leq 0.1$, respectively. The composition of lithium varies depending upon the state of charge and discharge, and the value of i1 represents a value in a completely discharged state.

Specific examples of such a lithium complex oxide include $Li_{h1}CoO_2$ (h1≅1) and $Li_{h2}Ni_{h3}Co_{(1-h3)}O_2$ (h2≅1 and 0<h3≤0.5).

In addition to these positive electrode materials, the positive electrode material capable of intercalating and deintercalating lithium may be further mixed with other positive electrode material. Examples of such other positive electrode material include other lithium oxides, lithium sulfides and other lithium-containing intercalation compounds (examples thereof include a lithium complex oxide having a structure of a layered rock salt type expressed by an average composition represented by the following formula (2) or (3); a lithium complex oxide having a structure of a spinel type expressed by an average composition represented by the following formula (4); and a lithium complex phosphate having a structure of an olivine type represented by the following formula (5)).

$$Li_{j1}Mn_{(1-j2-j3)}Ni_{j2}M2_{j3}O_{(2-j4)}F_{j5} \quad (2)$$

In the formula (2), M2 represents at least one member selected from the group consisting of cobalt, magnesium, aluminum, boron, titanium, vanadium, chromium, iron, copper, zinc, zirconium, molybdenum, tin, calcium, strontium and tungsten; and j1, j2, j3, j4 and j5 represent values falling within the ranges of $0.8 \leq j1 \leq 1.2$, $0 < j2 < 0.5$, $0 \leq j3 \leq 0.5$, $(j2+j3) < 1$, $-0.1 \leq j4 \leq 0.2$ and $0 \leq j5 \leq 0.1$, respectively. The composition of lithium varies depending upon the state of charge and discharge, and the value of j1 represents a value in a completely discharged state.

$$Li_{k1}Ni_{(1-k2)}M3_{k2}O_{(2-k3)}F_{k4} \quad (3)$$

In the formula (3), M3 represents at least one member selected from the group consisting of cobalt, manganese, magnesium, aluminum, boron, titanium, vanadium, chromium, iron, copper, zinc, molybdenum, tin, calcium, strontium and tungsten; and k1, k2, k3 and k4 represent values falling within the ranges of $0.8 \leq k1 \leq 1.2$, $0.005 \leq k2 \leq 0.5$, $-0.1 \leq k3 \leq 0.2$ and $0 \leq k4 \leq 0.1$, respectively. The composition of lithium varies depending upon the state of charge and discharge, and the value of k1 represents a value in a completely discharged state.

$$Li_{l1}Mn_{(2-l2)}M4_{l2}O_{l3}F_{l4} \quad (4)$$

In the formula (4), M4 represents at least one member selected from the group consisting of cobalt, nickel, magnesium, aluminum, boron, titanium, vanadium, chromium, iron, copper, zinc, molybdenum, tin, calcium, strontium and tungsten; and l1, l2, l3 and l4 represent values falling within the ranges of $0.9 \leq l1 \leq 1.1$, $0 \leq l2 \leq 0.6$, $3.7 \leq l3 \leq 4.1$ and $0 \leq l4 \leq 0.1$, respectively. The composition of lithium varies depending upon the state of charge and discharge, and the value of l1 represents a value in a completely discharged state.

$$Li_pM5PO_4 \qquad (5)$$

In the formula (5), M5 represents at least one member selected from the group consisting of cobalt, manganese, iron, nickel, magnesium, aluminum, boron, titanium, vanadium, niobium, copper, zinc, molybdenum, calcium, strontium, tungsten and zirconium; and p represents a value falling within the range of $0.9 \leq p \leq 1.1$. The composition of lithium varies depending upon the state of charge and discharge, and the value of p represents a value in a completely discharged state.

The positive electrode material capable of intercalating and deintercalating lithium may be formed as a complex particle obtained by coating the surface of a core particle composed of any one of the lithium-containing compounds represented by the foregoing formulae (1) to (5) by a fine particle composed of any one of these lithium-containing compounds. This is because higher electrode filling properties and an excellent cycle characteristic are obtainable.

The positive electrode material capable of intercalating and deintercalating lithium is cladded in such a manner that the primary particle size in the longitudinal direction makes the alkaline earth metal carbonate according to the first embodiment interspersed.

(1-2) Manufacturing Method of Positive Electrode

First of all, a manufacturing method of the alkaline earth metal carbonate having a fixed form according to the first embodiment is described.

[Manufacturing Method of Alkaline Earth Metal Carbonate Having a Fixed Form]

The manufacturing method is described by reference to calcium carbonate as a specific example of the alkaline earth metal carbonate having a fixed form.

Calcium carbonate having a fixed form can be manufactured by a synthesis method represented by a carbonation process, and its reaction pathway includes the following three steps.

Step 1: Reaction in which dense limestone is baked in a baking furnace, thereby decomposing into carbon dioxide and quick lime $$CaCO_3 \rightarrow CaO+CO_2$$

Step 2: Reaction in which water is added to quick lime to achieve hydration purification, thereby forming slaked lime $$CaO+H_2O \rightarrow Ca(OH)_2$$

Step 3: Reaction in which carbon dioxide generated in Step 1 is blown, thereby again obtaining calcium$_{carbonate}$ $$Ca(OH)_2+CO_2 \rightarrow CaCO_3+H_2O$$

At a glance, the foregoing reactions are a reaction for synthesizing calcium carbonate from calcium carbonate; however, it becomes possible to control various particle shapes and particle sizes through these three steps, whereby calcium carbonate having a fixed form can be manufactured.

Meanwhile, carbonates such as calcium carbonate having a primary particle size in the longitudinal direction of less than 0.01 μm can be manufactured by subjecting a carbonate to wet or dry pulverization using a general pulverizer such as a jet mill and a bandam mill, followed by classification. For that reason, particles having a fixed form are not obtainable; even by adding such a carbonate to the positive electrode, it is difficult to obtain a remarkable effect; and there is a concern that an unexpected fault is generated at the time of electrode coating that is one of the manufacturing steps. In this way, it may be impossible to say that the carbonate manufactured by pulverization is the carbonate having a fixed form according to the first embodiment.

[Manufacturing Method of Positive Electrode]

A positive electrode active material, a conductive agent and a binder are mixed together with the alkaline earth metal carbonate having a fixed form according to the first embodiment to prepare a positive electrode mixture, and this positive electrode mixture is dispersed in a solvent such as N-methyl-2-pyrrolidone to prepare a positive electrode mixture slurry in a paste form. Subsequently, this positive electrode mixture slurry is coated on the positive electrode collector 21A, and the solvent is then dried. The resultant is compression molded by a roll press or the like to form the positive electrode active material layer 21B. There is thus formed the positive electrode 21.

[Effect]

By using the positive electrode according the first embodiment, not only high electrode workability but high battery characteristics can be obtained while suppressing deterioration of the positive electrode active material. Such a positive electrode can be used for any of a primary battery or a secondary battery.

2. Second Embodiment

In a second embodiment according to the present application, a cylindrical type nonaqueous electrolyte battery using the positive electrode according to the first embodiment is described.

(2-1) Configuration of Nonaqueous Electrolyte Battery

Figure 5:
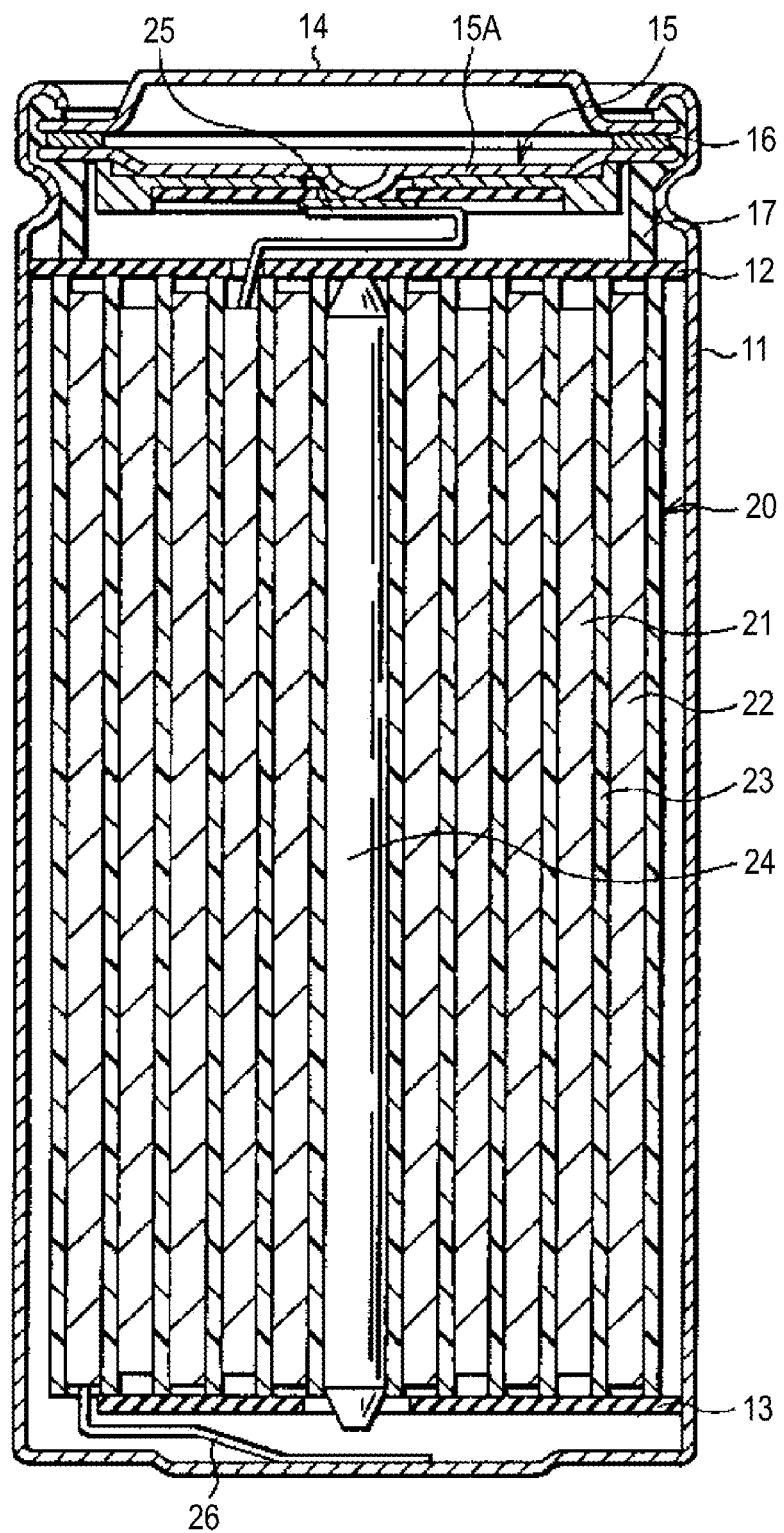
FIG. 5 is a sectional view showing a configuration of a secondary battery according to an embodiment.

FIG. 5 shows a sectional structure of a nonaqueous electrolyte battery according to the second embodiment. This nonaqueous electrolyte battery is a so-called lithium ion nonaqueous electrolyte battery using lithium (Li) as an electrode reactant, in which the capacity of a negative electrode is expressed by a capacity component due to intercalation and deintercalation of lithium. This nonaqueous electrolyte battery is of a so-called cylindrical type and has a wound electrode body 20 having a pair of a strip-shaped positive electrode 21 and a strip-shaped negative electrode 22 wound via a separator 23 in the inside of a substantially hollow columnar battery can 11. The battery can 11 is, for example, constituted of nickel-plated iron, and one end thereof is closed, with the other end being opened. In the inside of the battery can 11, a pair of insulating plates 12 and 13 is respectively disposed vertical to the winding peripheral face so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is, for example, constituted of the same material as that in the battery can 11. The safety valve mechanism 15 is electrically connected to the battery lid 14 via the positive temperature coefficient device 16. In this safety valve mechanism 15, when the internal pressure of the battery reaches a fixed value or more due to an internal short circuit or heating from the outside or the like, a disc plate 15A is reversed, whereby electrical connection between the battery lid 14 and the wound electrode body 20 is disconnected. When the temperature increases, the positive temperature coefficient device 16 controls the current by an increase of the resistance value, thereby preventing abnormal heat generation to be caused due to a large current. The gasket 17 is, for example, constituted of an insulating material, and asphalt is coated on the surface thereof.

For example, a center pin 24 is inserted on the center of the wound electrode body 20. In the wound electrode body 20, a positive electrode lead 25 made of aluminum or the like is connected to the positive electrode 21; and a negative electrode lead 26 made of nickel or the like is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

Figure 6:
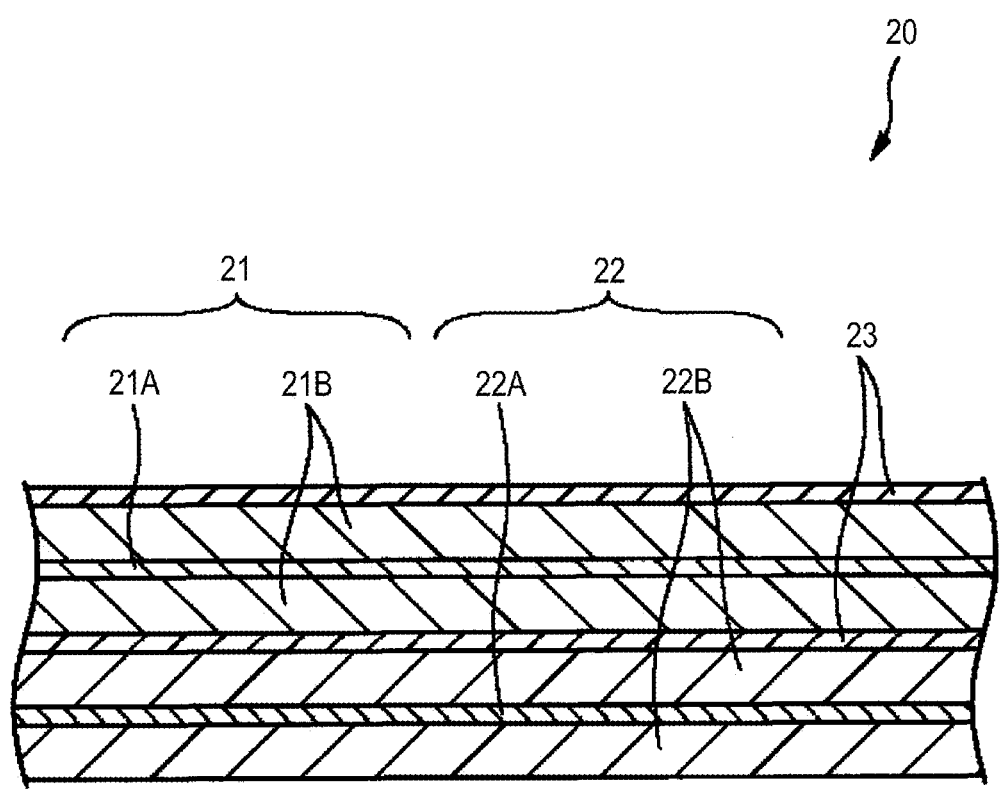
FIG. 6 is a sectional view showing enlargedly a part of a wound electrode body in the secondary battery shown in FIG. 1.

FIG. 6 shows enlargedly a part of the wound electrode body 20 shown in FIG. 5. In the second embodiment according to the present application, as for the positive electrode 21, the same positive electrode as that in the first embodiment according to the present application can be used. The negative electrode 22 and the separator 23 are hereunder described in detail.

[Negative Electrode]

The negative electrode 22 has, for example, a structure in which a negative electrode active material layer 22B is provided on the both surfaces of a negative electrode collector 22A having a pair of surfaces opposing to each other. While illustration is omitted, the negative electrode active material layer 22B may be provided on only one surface of the negative electrode collector 22A. The negative electrode collector 22A is, for example, constituted of a metal foil such as a copper foil.

The negative electrode active material layer 22B is constituted so as to contain, as a negative electrode active material, one or two or more kinds of a negative electrode material capable of intercalating and deintercalating lithium and further contain the same binder as that in the positive electrode active material layer 21B, if desired.

In this nonaqueous electrolyte battery, an electrochemical equivalent of the negative electrode material capable of intercalating and deintercalating lithium is larger than an electrochemical equivalent of the positive electrode 21, and a lithium metal does not theoretically deposit on the negative electrode 22 on the way of charge.

Also, this nonaqueous electrolyte battery is designed such that an open circuit voltage (namely, a battery voltage) in a completely charged state falls within the range of, for example, 4.20 V or more and not more than 6.00 V. Also, for example, it is preferable that the open circuit voltage in a fully charged state is 4.25 V or more and not more than 6.00 V. When the open circuit voltage in a fully charged state is 4.25 V or more, in comparison with a 4.20-V battery, even when the same positive electrode active material is concerned, a deintercalation amount of lithium per unit mass is large, and therefore, the amounts of the positive electrode material and the negative electrode material are regulated in response thereto. According to this, a high energy density is obtainable.

Examples of the negative electrode material capable of intercalating and deintercalating lithium include carbon materials such as hardly graphitized carbon, easily graphitized carbon, graphite, pyrolytic carbons, cokes, vitreous carbons, organic polymer compound burned materials, carbon fibers and active carbon. Of these, examples of the cokes include pitch coke, needle coke and petroleum coke. The organic polymer compound burned material as referred to herein is a material obtained through carbonization by burning a polymer material such as phenol resins and furan resins at an appropriate temperature, and a part thereof is classified into hardly graphitized carbon or easily graphitized carbon. Such a carbon material is preferable because a change in the crystal structure to be generated at the time of charge and discharge is very small, a high charge and discharge capacity is obtainable, and a favorable cycle characteristic is obtainable. In particular, graphite is preferable because its electrochemical equivalent is large, and a high energy density is obtainable. Also, hardly graphitized carbon is preferable because an excellent cycle characteristic is obtainable. Moreover, a material having a low charge and discharge potential, specifically one having a charge and discharge potential close to a lithium metal, is preferable because it is easy to realize a high energy density of the battery.

Examples of the negative electrode material capable of intercalating and deintercalating lithium further include a material capable of intercalating and deintercalating lithium and containing, as a constituent element, at least one member selected from the group consisting of metal elements and semi-metal elements. This is because by using such a material, a high energy density is obtainable. In particular, the joint use of such a material with the carbon material is more preferable because not only a high energy density is obtainable, but an excellent cycle characteristic is obtainable. This negative electrode material may be a simple substance, an alloy or a compound of a metal element or a semi-metal element. Also, the negative electrode material may be an electrode material having one or two or more kinds of such a phase in at least a part thereof. In the second embodiment according to the present application, the alloy includes alloys containing at least one metal element and at least one semi-metal element in addition to alloys composed of two or more metal elements. Also, the negative electrode material may contain a non-metal element. Examples of its texture include a solid solution, a eutectic (eutectic mixture), an intermetallic compound and one in which two or more thereof coexist.

Examples of the metal element or semi-metal element which constitutes this negative electrode material include magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd) and platinum (Pt). These may be crystalline or amorphous.

Of these, ones containing, as a constituent element, a metal element or a semi-metal element belonging to the Group 4B in the short form of the periodic table are preferable, and ones containing, as a constituent element, at least one of silicon and tin are especially preferable as this negative electrode material. This is because silicon and tin have large capability of intercalating and deintercalating lithium, and a high energy density is obtainable.

Examples of alloys of tin include alloys containing, as a second constituent element other than tin, at least one member selected from the group consisting of silicon, nickel, copper, iron, cobalt, manganese, zinc, indium, silver, titanium (Ti), germanium, bismuth, antimony (Sb) and chromium. Examples of alloys of silicon include alloys containing, as a second constituent element other than silicon, at least one member selected from the group consisting of tin, nickel, copper, iron, cobalt, manganese, zinc, indium, silver, titanium, germanium, bismuth, antimony and chromium.

Examples of compounds of tin or compounds of silicon include compounds containing oxygen (O) or carbon (C), and these compounds may contain the foregoing second constituent element in addition to tin or silicon.

Of these, CoSnC-containing materials containing tin, cobalt and carbon as constituent elements and having a content of carbon of 9.9% by mass or more and not more than 29.7% by mass and a proportion of cobalt of 30% by mass or more and not more than 70% by mass relative to the total sum of tin and cobalt are preferable as this negative electrode material. This is because in the foregoing composition range, not only a high energy density is obtainable, but an excellent cycle characteristic is obtainable.

This CoSnC-containing material may further contain other constituent element, if desired. As such other constituent element, for example, silicon, iron, nickel, chromium, indium, niobium (Nb), germanium, titanium, molybdenum (Mo), aluminum, phosphorus (P), gallium (Ga) and bismuth are preferable, and two or more kinds of these elements may be contained. This is because the capacity or cycle characteristic can be more enhanced.

This CoSnC-containing material has a phase containing tin, cobalt and carbon, and it is preferable that this phase has a low crystalline or amorphous structure. Also, in this CoSnC-containing material, it is preferable that at least a part of carbon that is the constituent element is bound to the metal element or semi-metal element that is other constituent element. This is because though it may be considered that a lowering of the cycle characteristic is caused due to aggregation or crystallization of tin or the like, when carbon is bound to other element, such aggregation or crystallization can be suppressed.

Examples of a measurement method for examining the binding state of elements include X-ray photoelectron spectroscopy (XPS). In this XPS, so far as graphite is concerned, a peak of the 1 s orbit (C1s) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a lower region than 284.5 eV. That is, when a peak of a combined wave of C1s obtained regarding the CoSnC-containing material appears in a lower region than 284.5 eV, at least a part of carbon (C) contained in the CoSnC-containing material is bound to a metal element or a semi-metal element as other constituent element.

In the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the CoSnC-containing material, the peak of the surface contamination carbon and the peak of the carbon in the CoSnC-containing material are separated from each other by means of analysis using, for example, a commercially available software program. In the analysis of the waveform, the position of a main peak existing on the lowest binding energy side is used as an energy reference (284.8 eV).

The negative electrode active material layer 22B may further contain other negative electrode active material. Also, the negative electrode active material layer 22B may contain other material which does not contribute to the charge, such as a conductive agent, a binder and a viscosity modifier. Examples of other negative electrode active material include carbon materials such as natural graphite, artificial graphite, hardly graphitized carbon and easily graphitized carbon. Examples of the conductive agent include a graphite fiber, a metal fiber and a metal powder. Examples of the binder include fluorocarbon based polymer compounds such as polyvinylidene fluoride; and synthetic rubbers such as a styrene-butadiene rubber and an ethylene-propylene-diene rubber. Examples of the viscosity modifier include carboxymethyl cellulose.

Furthermore, a porous insulating layer containing an insulating metal oxide may be disposed on the negative electrode active material layer 22B. It is preferable that the porous insulating layer contains an insulating metal oxide and a binder. It is preferable that the insulating metal oxide includes at least one member selected from the group consisting of alumina, silica, magnesia, titania and zirconia.

It is preferable that the binder includes at least one member selected from the group consisting of polyvinylidene fluoride (PVDF), polytetrafluoroethylene (PTFE), polyacrylonitrile (PAN), a styrene-butadiene rubber (SBR) and carboxymethyl cellulose (CMC).

[Separator]

The separator 23 partitions the positive electrode 21 and the negative electrode 22 from each other and allows a lithium ion to pass therethrough while preventing a short circuit of the current to be caused due to the contact of the both electrodes. The separator 23 is, for example, constituted of a porous film made of a synthetic resin such as polytetrafluoroethylene, polypropylene and polyethylene; or a porous film made of a ceramic. The separator 23 may have a structure in which two or more kinds of such a porous film are laminated.

The separator 23 is impregnated with an electrolytic solution that is a liquid electrolyte. This electrolytic solution contains a solvent and an electrolyte salt dissolved in this solvent.

The separator 23 is constituted so as to contain any one of polypropylene (PP), polyvinylidene fluoride (PVdF), polytetrafluoroethylene (PTFE), aluminum oxide ($Al_2O_3$) or silicon oxide ($SiO_2$) other than polyethylene. Also, the separator 23 may be constituted of a porous film made of a ceramic, and a mixture of several kinds among polyethylene (PE), polypropylene (PP) and polytetrafluoroethylene (PTFE) may be used as a porous film. Furthermore, polyvinylidene fluoride (PVdF), aluminum oxide ($Al_2O_3$) or silicon oxide ($SiO_2$) may be coated on the surface of a porous film made of polyethylene (PE), polypropylene (PP) or polytetrafluoroethylene (PTFE). Also, a structure in which two or more kinds of a porous film of polyethylene (PE), polypropylene (PP) or polytetrafluoroethylene (PTFE) are laminated may be used. A porous film made of a polyolefin is preferable because it is excellent in an effect for preventing a short circuit from occurring and is able to contrive to enhance the safety of a battery due to a shutdown effect.

[Nonaqueous Electrolyte]

The nonaqueous electrolyte contains an electrolyte salt and a nonaqueous solvent capable of dissolving this electrolyte salt therein.

The electrolyte salt contains one or two or more kinds of a light metal salt such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). Above all, at least one member selected from the group consisting of lithium hexafluorophosphate, lithium tetrafluoroborate, lithium perchlorate and lithium hexafluoroarsenate is preferable, and lithium hexafluorophosphate is more preferable. This is because the resistance of the electrolyte layer is lowered.

Examples of the solvent include nonaqueous solvents, for example, lactone based solvents such as γ-butyrolactone, γ-valerolactone, δ-valerolactone and ε-caprolactone; carbonate based solvents such as ethylene carbonate, propylene carbonate, butylene carbonate, vinylene carbonate, dimethyl carbonate, ethyl methyl carbonate and diethyl carbonate; ether based solvents such as 1,2-dimethoxyethane, 1-ethoxy-2-methoxyethane, 1,2-diethoxyethane, tetrahydrofuran and 2-methyltetrahydrofuran; nitrile based solvents such as acetonitrile; sulfolane based solvents; phosphoric acids; phosphate solvents; and pyrrolidones. The solvent may be used singly or in admixture of two or more kinds thereof.

Also, it is preferable that a cyclic carbonate or a chain ester is used as the nonaqueous solvent; and it is more preferable that the nonaqueous solvent contains a compound obtained by fluorinating a part or the whole of hydrogens of a cyclic carbonate or a chain carbonate. As such a fluorinated compound, it is preferable to use fluoroethylene carbonate (4-fluoro-1,3-dixolan-2-one) or difluoroethylene carbonate (4,5-difluoro-1,3-dioxolan-2-one). This is because even when the negative electrode 22 containing, as a negative electrode active material, a compound of silicon (Si), tin (Sn), germanium (Ge) or the like is used, a charge and discharge cycle characteristic can be enhanced, and in particular, difluoroethylene carbonate is excellent in an effect for improving the cycle characteristic.

It is preferable that 0.01% by weight or more and not more than 30% by weight of a halogen atom-containing cyclic carbonate derivative is incorporated into the nonaqueous electrolyte.

(2-2) Manufacturing Method of Nonaqueous Electrolyte Battery

[Manufacturing Method of Positive Electrode]

The positive electrode can be fabricated in the same manner as that in the first embodiment according to the present application.

[Manufacturing Method of Negative Electrode]

A negative electrode active material and a binder are mixed to prepare a negative electrode mixture, and this negative electrode mixture is dispersed in a solvent such as N-methyl-2-pyrrolidone, thereby preparing a negative electrode mixture slurry in a paste form. Subsequently, this negative electrode mixture slurry is coated on the negative electrode collector 22A, and after drying the solvent, the resultant is compression molded by a roll press or the like to form the negative electrode active material layer 22B. There is thus fabricated the negative electrode 22.

[Preparation of Nonaqueous Electrolyte]

The nonaqueous electrolyte is prepared by mixing a nonaqueous solvent and an electrolyte salt.

[Assembling of Nonaqueous Electrolyte Battery]

The positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded to the safety valve mechanism 15; and a tip end of the negative electrode lead 26 is also welded to the battery can 11. Then, the wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, the electrolytic solution is injected into the inside of the battery can 11 and impregnated in the separator 23. Thereafter, the battery lid 14, the safety valve mechanism 15 and the positive temperature coefficient device 16 are fixed to the open end of the battery can 11 upon being caulked via the gasket 17. There is thus formed the nonaqueous electrolyte battery shown in FIG. 5.

In this nonaqueous electrolyte battery, when charged, for example, a lithium ion is deintercalated from the positive electrode active material layer 21B and intercalated in the negative electrode active material layer 22B via the nonaqueous electrolyte. Also, when discharged, for example, a lithium ion is deintercalated from the negative electrode active material layer 22B and intercalated in the positive electrode active material layer 21B via the nonaqueous electrolyte.

[Effect]

According to the second embodiment, even by repeating charge and discharge under a high-temperature condition of the alkaline earth metal carbonate or by increasing the battery voltage after charge to 4.25 V or more, not only corrosion of the positive electrode can be suppressed, but an increase of impedance in the inside of the battery can be suppressed. In consequence, not only a battery with a high energy density can be achieved, but a cycle characteristic and a high-temperature characteristic can be enhanced.

3. Third Embodiment

In a third embodiment according to the present application, a laminated film type nonaqueous electrolyte battery using the positive electrode according to the first embodiment is described.

(3-1) Configuration of Nonaqueous Electrolyte Battery

Figure 7:
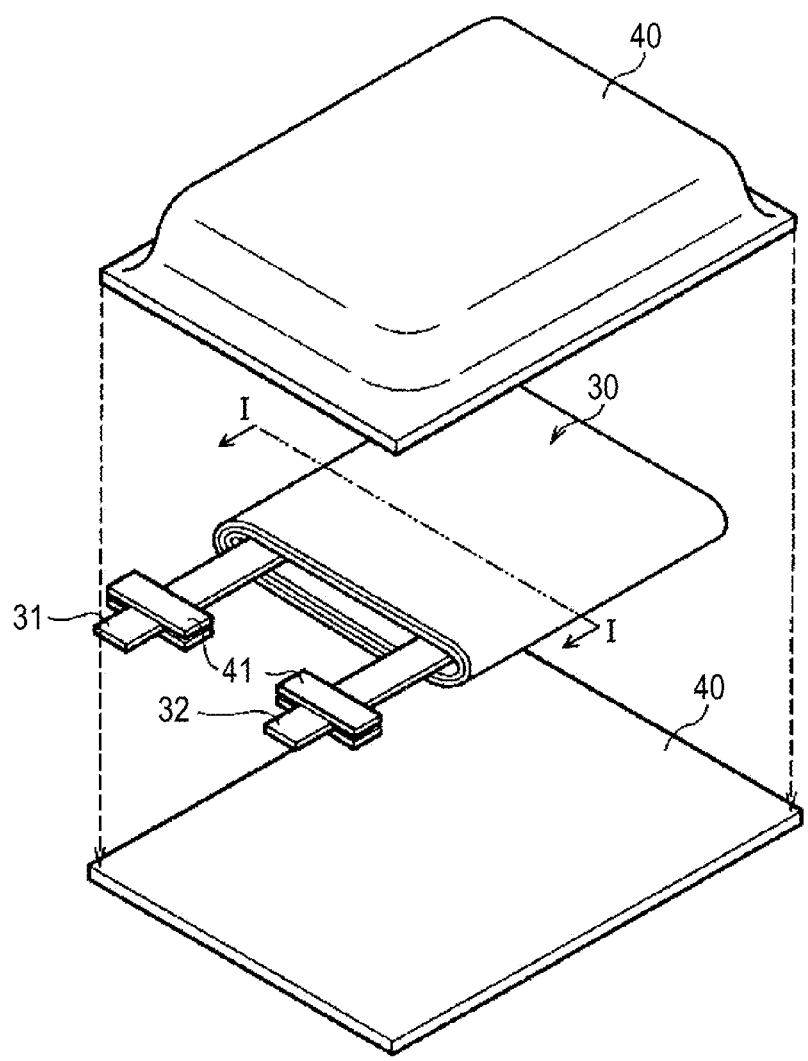
FIG. 7 is an exploded perspective view showing a configuration of a secondary battery according to a second embodiment.

FIG. 7 shows a configuration of a nonaqueous electrolyte battery according to the third embodiment. This nonaqueous electrolyte battery is called a so-called laminated film type and is one in which the wound electrode body 30 having a positive electrode lead 31 and a negative electrode lead 32 installed therein is housed in the inside of a film-shaped package member 40.

The positive electrode lead 31 and the negative electrode lead 32 are each led out in, for example, the same direction from the inside toward the outside of the package member 40. The positive electrode lead 31 and the negative electrode lead 32 are each constituted of a metal material, for example, aluminum, copper, nickel, stainless steel, etc. and formed in a thin plate state or a network state.

The package member 40 is, for example, constituted of a rectangular aluminum laminated film obtained by sticking a nylon film, an aluminum foil and a polyethylene film in this order. In the package member 40, for example, the side of the polyethylene film is disposed so as to be opposed to the wound electrode body 30, and the respective outer edges thereof are brought into intimate contact with each other by means of fusion or with an adhesive. A contact film 41 is inserted between the package member 40 and each of the positive electrode lead 31 and the negative electrode lead 32 for the purpose of preventing invasion of the outside air. The contact film 41 is constituted of a material having adhesion to each of the positive electrode lead 31 and the negative electrode lead 32, for example, polyolefin resins such as polyethylene, polypropylene, modified polyethylene and modified polypropylene.

The package member 40 may be constituted of a laminated film having other structure, a polymer film such as polypropylene or a metal film in place of the foregoing aluminum laminated film.

Figure 8:
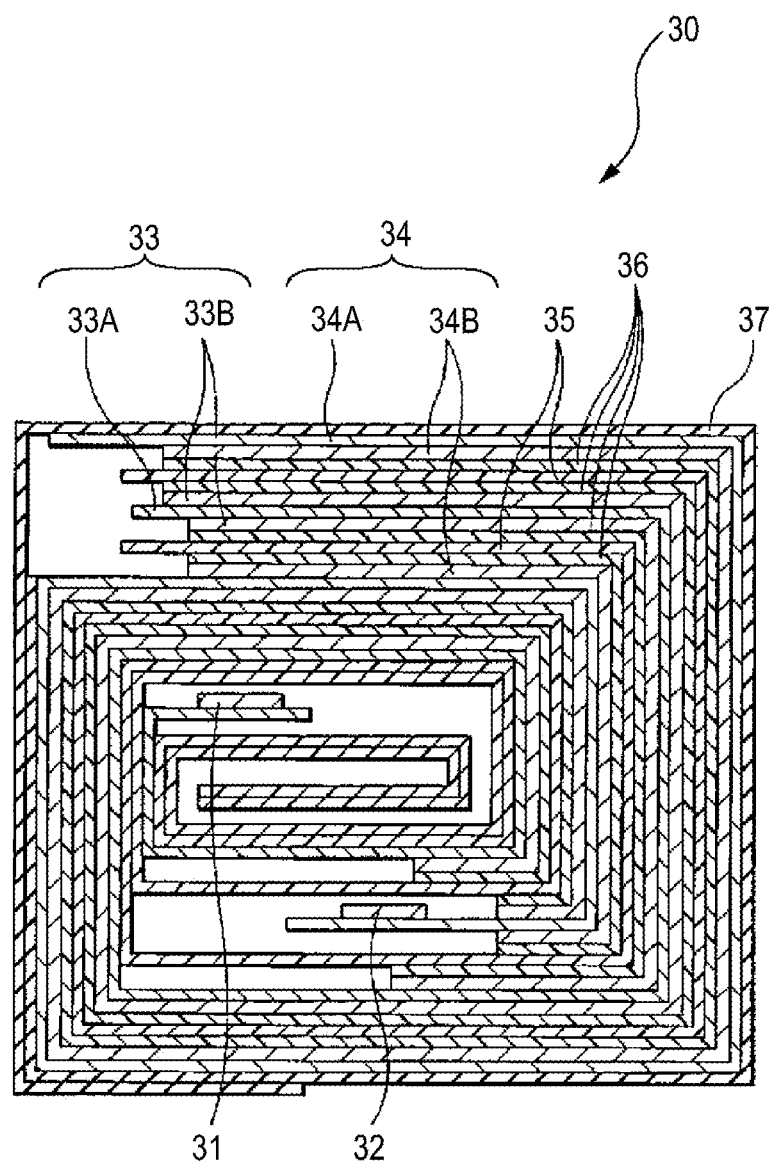
FIG. 8 is a sectional view showing a configuration along an line of a wound electrode body shown in FIG. 7.

FIG. 8 shows a sectional structure along an I-I line of the wound electrode body 30 shown in FIG. 7. The wound electrode body 30 is one prepared by laminating a positive electrode 33 and a negative electrode 34 via a separator 35 and an electrolyte layer 36 and winding the laminate, and an outermost peripheral part thereof is protected by a protective tape 37.

[Positive Electrode]

The positive electrode 33 has a structure in which a positive electrode active material layer 33B is provided on one surface or both surfaces of a positive electrode collector 33A, and the same positive electrode as that in each of the first and second embodiments according to the present application can be used.

[Negative Electrode]

The negative electrode 34 has a structure in which a negative electrode active material layer 34B is provided on one surface or both surfaces of a negative electrode collector 34A, and the negative electrode active material layer 34B and the positive electrode active material layer 33B are disposed opposing to each other. The configuration of each of the negative electrode collector 34A and the negative electrode active material layer 34B is the same as the configuration of each of the negative electrode collector 22A and the negative electrode active material layer 22B in the foregoing second embodiment according to the present application.

[Separator]

The separator 35 is the same as the separator 23 in the second embodiment according to the present application.

[Nonaqueous Electrolyte]

The electrolyte layer 36 is the nonaqueous electrolyte according to the third embodiment, contains a nonaqueous electrolytic solution and a polymer compound serving as a holding material for holding the nonaqueous electrolytic solution therein and is formed in a so-called gel form. The electrolyte in a gel form is preferable because not only a high ion conductivity is obtainable, but the liquid leakage of the battery can be prevented from occurring.

Examples of the polymer material include ether based polymer compounds such as polyethylene oxide and a crosslinked material containing polyethylene oxide; ester based polymer compounds such as polymethacrylates; acrylate based polymer compounds; and polymers of vinylidene fluoride such as polyvinylidene fluoride and a copolymer of vinylidene fluoride and hexafluoropropylene. These compounds may be used alone or in admixture of two or more kinds thereof. In particular, from the viewpoint of oxidation-reduction stability, it is desirable to use a fluorocarbon based polymer compound such as polymers of vinylidene fluoride.

(3-2) Manufacturing Method of Nonaqueous Electrolyte Battery

This nonaqueous electrolyte battery can be, for example, manufactured in the following manner.

[Manufacturing Method of Positive Electrode]

The positive electrode 33 can be fabricated in the same method as that in the first embodiment according to the present application.

[Manufacturing Method of Negative Electrode]

The negative electrode 34 can be fabricated in the same method as that in the first embodiment according to the present application.

[Assembling of Nonaqueous Electrolyte Battery]

A precursor solution containing an electrolytic solution, a polymer compound and a mixed solvent is coated on each of the positive electrode 33 and the negative electrode 34, and the mixed solvent is then vaporized to form the electrolyte layer 36. Thereafter, the positive electrode lead 31 is installed in an end of the positive electrode collector 33A by means of welding, and the negative electrode lead 32 is also installed in an end of the negative electrode collector 34A by means of welding.

Subsequently, the positive electrode 33 and the negative electrode 34 each provided with the electrolyte layer 36 are laminated via the separator 35 to form a laminate, the laminate is then wound in the longitudinal direction thereof, and the protective tape 37 is allowed to adhere to the outermost peripheral part to form the wound electrode body 30. Finally, for example, the wound electrode body 30 is interposed between the package members 40, and the outer edges of the package members 40 are brought into intimate contact with each other by means of heat fusion or the like, thereby sealing the wound electrode body 30. On that occasion, the contact film 41 is inserted between each of the positive electrode lead 31 and the negative electrode lead 32 and the package member 40. According to this, the nonaqueous electrolyte battery shown in FIGS. 7 and 8 is completed.

Also, this nonaqueous electrolyte battery may be fabricated in the following manner. First of all, the positive electrode 33 and the negative electrode 34 are prepared in the foregoing manner; the positive electrode lead 31 and the negative electrode lead 32 are installed in the positive electrode 33 and the negative electrode 34, respectively; the positive electrode 33 and the negative electrode 34 are then laminated via the separator 35 and wound; and the protective tape 37 is allowed to adhere to the outermost peripheral part to form a wound body that is a precursor of the wound electrode body 30. Subsequently, this wound body is interposed between the package members 40, and the outer edges exclusive of one side are subjected to heat fusion to form a bag and then housed in the inside of the package member 40. Subsequently, a composition for electrolyte containing an electrolytic solution, a monomer that is a raw material of the polymer compound, a polymerization initiator and optionally, other material such as a polymerization inhibitor is prepared and injected into the inside of the package member 40.

After injecting the composition for electrolyte, an opening of the package member 40 is hermetically sealed by means of heat fusion in a vacuum atmosphere. Subsequently, the monomer is polymerized upon heating to form a polymer compound, thereby forming the electrolyte layer 36 in a gel form. There is thus assembled the nonaqueous electrolyte battery shown in FIGS. 7 and 8.

[Effect]

The actions and effects of this secondary battery are the same as those in the foregoing first and second embodiments according to the present application.

EXAMPLES

Specific working examples of the present application are hereunder described in detail, but it should not be construed that the present application is limited only to these working examples.

Example 1

In Example 1, battery characteristics were evaluated by varying a shape, a particle system, a specific surface area and a mixing ratio in a positive electrode mixture regarding a carbonate to be contained in a positive electrode.

Examples 1-1 to 1-7

Fabrication of Positive Electrode

A lithium cobalt complex oxide as a positive electrode active material, ketjen black (amorphous carbon powder) as a conductive agent, polyvinylidene fluoride as a binder and calcium carbonate having a cubic particle shape and having a specific surface area as determined by the BET method in the range of from 1.0 m$^2$/g to 2.0 m$^2$/g were mixed in a weight ratio shown in Table 1, and the mixture was dispersed in N-methyl-2-pyrrolidone as a solvent to prepare a positive electrode mixture slurry. Subsequently, this positive electrode mixture slurry was uniformly coated on the both surfaces of a positive electrode collector made of a strip-shaped aluminum foil having a thickness of 20 μm, dried and then compression molded to form a positive electrode active material layer. There was thus fabricated a positive electrode. Thereafter, a positive electrode lead made of aluminum was installed in one end of the positive electrode collector. The shape of calcium carbonate is strictly not cubic, but it is close to a rectangular parallelepipedal shape.

[Fabrication of Negative Electrode]

90 parts by mass of a graphite powder as a negative electrode active material and 10 parts by mass of polyvinylidene fluoride (PVdF) as a binder were mixed to prepare a negative electrode mixture. This negative electrode mixture was dispersed in N-methyl-2-pyrrolidone (NMP) to prepare a negative electrode mixture slurry; and the negative electrode mixture slurry was then uniformly coated on the both surfaces of a negative electrode collector made of a strip-shaped copper foil and having a thickness of 15 μm and further heat press molded to form a negative electrode active material layer. On that occasion, the amount of the positive electrode active material and the amount of the negative electrode active material were regulated so as to satisfy a condition of {(charge capacity of positive electrode)<(charge capacity of negative electrode)}, thereby designing an open circuit voltage (namely, a battery voltage) at the time of complete charge at 4.20 V. The charge capacity as referred to herein means a capacity component due to intercalation and deintercalation of a light metal. Subsequently, a negative electrode lead made of nickel was installed in one end of the negative electrode collector.

After fabricating each of the positive electrode and the negative electrode, a separator made of a microporous film was prepared; the negative electrode, the separator, the positive electrode and the separator were laminated in this order; and the laminate was helically wound many times, thereby fabricating a wound electrode body of a jelly roll type having an outer diameter of 17.5 mm. On that occasion, a polyethylene separator having a thickness of 16 μm was used as the separator.

After fabricating the wound electrode body, the wound electrode body was interposed between a pair of insulating plates; not only the negative electrode lead was welded with a battery can, but the positive electrode lead was welded with a safety valve mechanism; and the wound electrode body was then housed in the inside of the battery can made of nickel-plated iron. Subsequently, an electrolytic solution was injected into the inside of the battery can in a reduced pressure mode. As a nonaqueous solvent used for the electrolytic solution, a mixed solvent obtained by mixing ethylene carbonate, propylene carbonate, dimethyl carbonate and ethyl methyl carbonate in a mass ratio of ethylene carbonate/propylene carbonate/dimethyl carbonate/ethyl methyl carbonate/4-fluoro-1,3-dioxolan-2-one (FEC) of 20/5/60/5/10. As an electrolyte salt, lithium hexafluorophosphate (LiPF$_6$) was used and designed so as to have a salt concentration of 1.2 moles/kg, thereby forming the electrolytic solution.

Thereafter, the battery lid was caulked with the battery can via a gasket. There were thus fabricated cylindrical type secondary batteries each having a diameter of 18 mm and a height of 65 mm.

Example 1-8

A secondary battery was fabricated in exactly the same manner as in Example 1-4, except for using calcium carbonate having a cubic or rectangular parallelepipedal particle shape and having a primary particle size of from 5 to 10 μm.

Example 1-9

A secondary battery was fabricated in exactly the same manner as in Example 1-4, except for using calcium carbonate having a cubic or rectangular parallelepipedal particle shape and having a primary particle size of from 3 to 5 μm.

Example 1-10

A secondary battery was fabricated in exactly the same manner as in Example 1-4, except for using calcium carbonate having a cubic or rectangular parallelepipedal particle shape and having a primary particle size of from 1 to 3 μm.

Example 1-11

A secondary battery was fabricated in exactly the same manner as in Example 1-4, except for using calcium carbonate having a cubic or rectangular parallelepipedal particle shape and having a primary particle size of from 0.1 to 0.5 μm.

Example 1-12

A secondary battery was fabricated in exactly the same manner as in Example 1-4, except for using calcium carbonate having a cubic or rectangular parallelepipedal particle shape and having a primary particle size of from 0.01 to 0.1 μm.

Example 1-13

A secondary battery was fabricated in exactly the same manner as in Example 1-4, except for using calcium carbonate having a cubic or rectangular parallelepipedal particle shape and having a specific surface area as determined by the BET method in the range of from 2.0 m$^2$/g to 5 m$^2$/g.

Example 1-14

A secondary battery was fabricated in exactly the same manner as in Example 1-4, except for using calcium carbonate having a cubic or rectangular parallelepipedal particle shape and having a specific surface area as determined by the BET method in the range of from 5 m$^2$/g to 10 m$^2$/g.

Example 1-15

A secondary battery was fabricated in exactly the same manner as in Example 1-4, except for using calcium carbonate having a cubic or rectangular parallelepipedal particle shape and having a specific surface area as determined by the BET method in the range of from 10 m$^2$/g to 20 m$^2$/g.

Example 1-16

A secondary battery was fabricated in exactly the same manner as in Example 1-4, except for using calcium carbonate having a cubic or rectangular parallelepipedal particle shape and having a specific surface area as determined by the BET method in the range of from 20 $m^2/g$ to 30 $m^2/g$.

Example 1-17

A secondary battery was fabricated in exactly the same manner as in Example 1-4, except for using calcium carbonate having a cubic or rectangular parallelepipedal particle shape and having a specific surface area as determined by the BET method in the range of from 40 $m^2/g$ to 50 $m^2/g$.

Example 1-18

A secondary battery was fabricated in exactly the same manner as in Example 1-4, except for using calcium carbonate having a cubic or rectangular parallelepipedal particle shape and having a specific surface area as determined by the BET method in the range of from 60 $m^2/g$ to 90 $m^2/g$.

Example 1-19

A secondary battery was fabricated in exactly the same manner as in Example 1-4, except for using calcium carbonate having a spindle-shaped particle shape and having a primary particle size in the longitudinal direction of from 1 to 3 µm.

Example 1-20

A secondary battery was fabricated in exactly the same manner as in Example 1-4, except for using calcium carbonate having a flaky particle shape and having a primary particle size in the longitudinal direction of from 1 to 3 µm.

Example 1-21

A secondary battery was fabricated in exactly the same manner as in Example 1-4, except for replacing the calcium carbonate having a cubic or rectangular parallelepipedal particle shape and having a primary particle size in the longitudinal direction of from 1 to 3 µm with magnesium carbonate having the same particle size.

Example 1-22

A secondary battery was fabricated in exactly the same manner as in Example 1-4, except for replacing the calcium carbonate having a cubic or rectangular parallelepipedal particle shape and having a primary particle size in the longitudinal direction of from 1 to 3 µm with barium carbonate having the same particle size.

Example 1-23

A secondary battery was fabricated in exactly the same manner as in Example 1-4, except for replacing the calcium carbonate having a cubic or rectangular parallelepipedal particle shape and having a primary particle size in the longitudinal direction of from 1 to 3 µm with strontium carbonate having the same particle size.

Comparative Examples 1-1 to 1-7

Secondary batteries were fabricated in exactly the same manners as in Examples 1-1 to 1-7, respectively, except for using amorphous calcium carbonate having a specific surface area as determined by the BET method in the range of from 1.0 $m^2/g$ to 2.0 $m^2/g$. In the amorphous carbonate, the primary particle size does not exist, and therefore, the particle size is not described.

[Evaluation of Battery]

Each of the thus fabricated secondary batteries of the Examples and Comparative Examples was evaluated as follows.

(a) Measurement of Capacity Retention Rate after 600 Cycles

Each of the secondary batteries of the Examples and Comparative Examples was charged in an atmosphere at 25° C. at a constant-current density of 1 $mA/cm^2$ until the battery voltage reached 4.20 V, and then subjected to constant-voltage charge at a battery voltage of 4.20 V until the current density reached 0.02 $mA/cm^2$. Subsequently, the secondary battery was discharged at a constant-current density of 1 $mA/cm^2$ until the battery voltage reached 3.0 V, thereby measuring an initial capacity. Subsequently, charge and discharge were repeated under the same condition as in the case of determining an initial capacity, thereby measuring a discharge capacity at the 600th cycle.

A capacity retention rate (%) relative to the initial capacity was calculated from the determined discharge capacity according to the following expression.

$$\text{Capacity retention rate(\%)after 600 cycles} = \{(\text{Discharge capacity after 600 cycles})/(\text{Initial capacity})\} \times 100(\%)$$

(b) Measurement of capacity retention rate after 300 cycles of overcharge

Each of the secondary batteries of the Examples and Comparative Examples was charged in an atmosphere at 25° C. at a constant-current density of 1 $mA/cm^2$ until the battery voltage reached 4.25 V, a value of which is higher by 50 mV than the battery voltage in the measurement in (a), and then subjected to constant-voltage charge at that battery voltage until the current density reached 0.02 $mA/cm^2$. Thereafter, the secondary battery was discharged at a constant-current density of 1 $mA/cm^2$ until the battery voltage reached 3.0 V, thereby measuring an initial capacity. Furthermore, charge and discharge were repeated under the same condition, thereby measuring a discharge capacity at the 300th cycle.

A capacity retention rate (%) relative to the initial capacity was calculated from the determined discharge capacity according to the following expression. Even when the secondary battery was charged to a voltage which is higher by 50 mV than the prescribed battery voltage, namely 4.25 V, a relationship of {(charge capacity of positive electrode)<(charge capacity of negative electrode)} was maintained. The charge capacity as referred to herein means a capacity component due to intercalation and deintercalation of a light metal.

$$\text{Capacity retention rate(\%)after 300 cycles of overcharge} = \{(\text{Discharge capacity after 300 cycles})/(\text{Initial capacity})\} \times 100(\%)$$

The measurement results are shown in the following Tables 1 and 2.

TABLE 1

| | Cladding component | | | | Positive electrode composition | | | | Capacity retention rate after 600 cycles [%] | Capacity retention rate after 300 cycles of overcharge [%] |
|---|---|---|---|---|---|---|---|---|---|---|
| | Material | Shape of cladding component | Particle size [μm] | Specific surface area [m²/g] | Positive electrode active material [wt %] | Cladding component [wt %] | Conductive agent [wt %] | Binder [wt %] | | |
| Example 1-1 | CaCO₃ | Cubic or rectangular parallelepipedal | — | 1 to 2 | 93.999 | 0.001 | 3 | 3 | 64 | 70 |
| Example 1-2 | CaCO₃ | Cubic or rectangular parallelepipedal | — | 1 to 2 | 93.99 | 0.01 | 3 | 3 | 68 | 74 |
| Example 1-3 | CaCO₃ | Cubic or rectangular parallelepipedal | — | 1 to 2 | 93.9 | 0.10 | 3 | 3 | 71 | 79 |
| Example 1-4 | CaCO₃ | Cubic or rectangular parallelepipedal | — | 1 to 2 | 93 | 1.0 | 3 | 3 | 76 | 82 |
| Example 1-5 | CaCO₃ | Cubic or rectangular parallelepipedal | — | 1 to 2 | 89 | 5.0 | 3 | 3 | 75 | 81 |
| Example 1-6 | CaCO₃ | Cubic or rectangular parallelepipedal | — | 1 to 2 | 84 | 10.0 | 3 | 3 | 74 | 81 |
| Example 1-7 | CaCO₃ | Cubic or rectangular parallelepipedal | — | 1 to 2 | 79 | 15.0 | 3 | 3 | 72 | 81 |
| Example 1-8 | CaCO₃ | Cubic or rectangular parallelepipedal | 5 to 10 | — | 93 | 1.0 | 3 | 3 | 76 | 83 |
| Example 1-9 | CaCO₃ | Cubic or rectangular parallelepipedal | 3 to 5 | — | 93 | 1.0 | 3 | 3 | 78 | 84 |
| Example 1-10 | CaCO₃ | Cubic or rectangular parallelepipedal | 1 to 3 | — | 93 | 1.0 | 3 | 3 | 80 | 86 |
| Example 1-11 | CaCO₃ | Cubic or rectangular parallelepipedal | 0.1 to 0.5 | — | 93 | 1.0 | 3 | 3 | 83 | 89 |
| Example 1-12 | CaCO₃ | Cubic or rectangular parallelepipedal | 0.01 to 0.1 | — | 93 | 1.0 | 3 | 3 | 86 | 92 |
| Example 1-13 | CaCO₃ | Cubic or rectangular parallelepipedal | — | 2 to 5 | 93 | 1.0 | 3 | 3 | 77 | 83 |
| Example 1-14 | CaCO₃ | Cubic or rectangular parallelepipedal | — | 5 to 10 | 93 | 1.0 | 3 | 3 | 79 | 84 |
| Example 1-15 | CaCO₃ | Cubic or rectangular parallelepipedal | — | 10 to 20 | 93 | 1.0 | 3 | 3 | 81 | 86 |
| Example 1-16 | CaCO₃ | Cubic or rectangular parallelepipedal | — | 20 to 30 | 93 | 1.0 | 3 | 3 | 82 | 88 |
| Example 1-17 | CaCO₃ | Cubic or rectangular parallelepipedal | — | 40 to 50 | 93 | 1.0 | 3 | 3 | 84 | 90 |
| Example 1-18 | CaCO₃ | Cubic or rectangular parallelepipedal | — | 60 to 90 | 93 | 1.0 | 3 | 3 | 86 | 92 |
| Example 1-19 | CaCO₃ | Spindle-shaped | 1 to 3 | — | 93 | 1.0 | 3 | 3 | 80 | 87 |
| Example 1-20 | CaCO₃ | Flaky | 1 to 3 | — | 93 | 1.0 | 3 | 3 | 81 | 86 |
| Example 1-21 | MgCO₃ | Cubic or rectangular parallelepipedal | 1 to 3 | — | 93 | 1.0 | 3 | 3 | 79 | 87 |
| Example 1-22 | BaCO₃ | Cubic or rectangular parallelepipedal | 1 to 3 | — | 93 | 1.0 | 3 | 3 | 80 | 85 |
| Example 1-23 | SrCO₃ | Cubic or rectangular parallelepipedal | 1 to 3 | — | 93 | 1.0 | 3 | 3 | 79 | 86 |

TABLE 2

| | Cladding component | | | | Positive electrode composition | | | | Capacity retention rate after 600 cycles [%] | Capacity retention rate after 300 cycles of overcharge [%] |
|---|---|---|---|---|---|---|---|---|---|---|
| | Material | Shape of cladding component | Particle size [μm] | Specific surface area [m²/g] | Positive electrode active material [wt %] | Cladding component [wt %] | Conductive agent [wt %] | Binder [wt %] | | |
| Comparative Example 1-1 | CaCO₃ | Amorphous | — | 1 to 2 | 93.999 | 0.001 | 3 | 3 | 58 | 65 |
| Comparative Example 1-2 | CaCO3 | Amorphous | — | 1 to 2 | 93.99 | 0.01 | 3 | 3 | 60 | 66 |
| Comparative Example 1-3 | CaCO₃ | Amorphous | — | 1 to 2 | 93.9 | 0.10 | 3 | 3 | 61 | 68 |
| Comparative Example 1-4 | CaCO₃ | Amorphous | — | 1 to 2 | 93 | 1.0 | 3 | 3 | 63 | 72 |
| Comparative Example 1-5 | CaCO₃ | Amorphous | — | 1 to 2 | 89 | 5.0 | 3 | 3 | 62 | 71 |
| Comparative Example 1-6 | CaCO₃ | Amorphous | — | 1 to 2 | 84 | 10.0 | 3 | 3 | 61 | 71 |
| Comparative Example 1-7 | CaCO₃ | Amorphous | — | 1 to 2 | 79 | 15.0 | 3 | 3 | 60 | 70 |

In comparison of Examples 1 to 1-7 with Comparative Examples 1-1 to 1-7, it was noted that by incorporating calcium carbonate having a cubic or rectangular parallelepipedal shape into the positive electrode, conspicuously excellent effects are obtainable as compared with the case of incorporating amorphous calcium carbonate into the positive electrode. It was noted that when the weight ratio of calcium carbonate having a cubic or rectangular parallelepipedal shape occupying in the positive electrode composition is in the range of 0.01% by weight or more, high effects are obtainable; and that taking into consideration the capacity, the weight ratio of calcium carbonate having a cubic or rectangular parallelepipedal shape occupying in the positive electrode composition is preferably not more than 10% by weight.

In comparison of Examples 1-8 to 1-12, it was noted that the smaller the primary particle size of calcium carbonate having a fixed form, the higher the effects are obtainable; and that in particular, when the primary particle size of not more than 3 μm, preferred results are obtainable.

In comparison of Examples 1-13 to 1-18, it was noted that the larger the specific surface area as determined by the BET method of calcium carbonate having a fixed form, the higher the effects are obtainable; and that the specific surface area as determined by the BET method of calcium carbonate having a fixed form is preferably 2.0 m2/g or more, and especially preferably 5.0 m2/g or more.

It was noted from Examples 1-19 and 1-20 that high effects are obtainable even when the fixed form that calcium carbonate has is spindle-shaped or flaky.

It was noted from Examples 1-21, 1-22 and 1-23 that equivalent effects are obtainable even when an alkaline earth metal other than calcium, such as magnesium, barium and strontium, is used.

Example 2

In Example 2, battery characteristics of secondary batteries having a carbonate added thereto were evaluated by varying a charge voltage of the secondary battery.

Examples 2-1 to 2-5

An open circuit voltage (namely, a battery voltage) at the time of complete charge was set to from 4.20 to 4.55 V as shown in Table 3, and the amount of a positive electrode material and the amount of a negative electrode material were regulated so as to satisfy a condition of {(charge capacity of positive electrode)<(charge capacity of negative electrode)}. Secondary batteries were fabricated in exactly the same manner as in Example 1-4, except for this. The charge capacity as referred to herein means a capacity component due to intercalation and deintercalation of a light metal.

Comparative Examples 2-1 to 2-5

Secondary batteries were fabricated in exactly the same manners as in Examples 2-1 to 2-5, respectively, except for using amorphous calcium carbonate having a specific surface area as determined by the BET method in the range of from 1.0 m2/g to 2.0 m2/g.

[Evaluation of Battery]

Each of the thus fabricated secondary batteries of the Examples and Comparative Examples was evaluated as follows.

(a) Measurement of Capacity Retention Rate after 600 Cycles

Each of the secondary batteries of the Examples and Comparative Examples was charged in an atmosphere at 25° C. at a constant-current density of 1 mA/cm2 until the battery voltage reached a prescribed battery voltage, and then subjected to constant-voltage charge at a prescribed battery voltage until the current density reached 0.02 mA/cm2. Subsequently, the secondary battery was discharged at a constant-current density of 1 mA/cm2 until the battery voltage reached 3.0 V, thereby measuring an initial capacity. Subsequently, charge and discharge were repeated under the same condition as in the case of determining an initial capacity, thereby measuring a discharge capacity at the 600th cycle.

A capacity retention rate (%) relative to the initial capacity was calculated from the determined discharge capacity according to the following expression. The prescribed battery voltage is a charge voltage shown in Table 3.

Capacity retention rate(%)after 600 cycles={(Discharge capacity after 600 cycles)/(Initial capacity)}×100(%)

(b) Measurement of capacity retention rate after 300 cycles of overcharge

Each of the secondary batteries of the Examples and Comparative Examples was charged in an atmosphere at 25° C. at a constant-current density of 1 mA/cm$^2$ until the battery voltage reached a voltage, a value of which is higher by 50 mV than each of the prescribed battery voltages (namely, in the range of from 4.25 V to 4.60 V), and then subjected to constant-voltage charge at that battery voltage until the current density reached 0.02 mA/cm$^2$. Subsequently, the secondary battery was discharged at a constant-current density of 1 mA/cm$^2$ until the battery voltage reached 3.0 V, thereby measuring an initial capacity. Furthermore, charge and discharge were repeated under the same condition, thereby measuring a discharge capacity at the 300th cycle.

A capacity retention rate (%) relative to the initial capacity was calculated from the determined discharge capacity according to the following expression. The prescribed battery voltage is a charge voltage shown in Table 3. Even when the secondary battery was charged to a voltage which is higher by 50 mV than each of the prescribed battery voltages, a relationship of {(charge capacity of positive electrode)<(charge capacity of negative electrode)} was maintained. The charge capacity as referred to herein means a capacity component due to intercalation and deintercalation of a light metal.

Capacity retention rate(%)after 300 cycles of overcharge={(Discharge capacity after 300 cycles)/(Initial capacity)}×100(%)

The measurement results are shown in the following Table 3.

TABLE 3

| | Cladding component | | | | | Capacity retention | |
| --- | --- | --- | --- | --- | --- | --- | --- |
| | Material | Shape of cladding component | Particle size [μm] | Specific surface area [m$^2$/g] | Charge voltage [V] | Capacity retention rate after 600 cycles [%] | rate after 300 cycles of overcharge [%] |
| Example 2-1 | CaCO$_3$ | Cubic or rectangular parallelepipedal | — | 1 to 2 | 4.20 | 76 | 82 |
| Example 2-2 | CaCO$_3$ | Cubic or rectangular parallelepipedal | — | 1 to 2 | 4.25 | 73 | 79 |
| Example 2-3 | CaCO$_3$ | Cubic or rectangular parallelepipedal | — | 1 to 2 | 4.35 | 70 | 75 |
| Example 2-4 | CaCO$_3$ | Cubic or rectangular parallelepipedal | — | 1 to 2 | 4.45 | 67 | 71 |
| Example 2-5 | CaCO$_3$ | Cubic or rectangular parallelepipedal | — | 1 to 2 | 4.55 | 63 | 66 |

TABLE 3-continued

| | | Cladding component | | | | Capacity retention | |
|---|---|---|---|---|---|---|---|
| | Material | Shape of cladding component | Particle size [μm] | Specific surface area [m²/g] | Charge voltage [V] | Capacity retention rate after 600 cycles [%] | rate after 300 cycles of overcharge [%] |
| Comparative Example 2-1 | CaCO₃ | Amorphous | — | 1 to 2 | 4.20 | 63 | 72 |
| Comparative Example 2-2 | CaCO₃ | Amorphous | — | 1 to 2 | 4.25 | 58 | 67 |
| Comparative Example 2-3 | CaCO₃ | Amorphous | — | 1 to 2 | 4.35 | 54 | 62 |
| Comparative Example 2-4 | CaCO₃ | Amorphous | — | 1 to 2 | 4.45 | 48 | 52 |
| Comparative Example 2-5 | CaCO₃ | Amorphous | — | 1 to 2 | 4.55 | 39 | 40 |

In comparison of Examples 2-1 to 2-5 with Comparative Examples 2-1 to 2-5, it was noted that by incorporating calcium carbonate having a primary particle size in the longitudinal direction of not more than 5.0 μm into the positive electrode, even when the open circuit voltage (namely, the battery voltage) at the time of complete charge exceeds 4.20 V, a favorable cycle characteristic is obtainable.

Example 3

In Example 3, battery characteristics of secondary batteries having a carbonate added thereto were evaluated by varying a composition of an electrolytic solution of the secondary battery.

Examples 3-1 to 3-8

An electrolytic solution was prepared so as to regulate a weight ratio of 4-fluoro-1,3-dioxolan-2-one (FEC) and/or 4,5-difluoro-1,3-dioxolan-2-one (DFEC) occupying in the electrolytic solution composition to a value shown in Table 4. Secondary batteries were fabricated in exactly the same manner as in Example 1-4, except for this. On that occasion, the composition was varied such that a total sum of the weight ratios of ethylene carbonate (EC), propylene carbonate (PC) and FEC and/or DFEC occupying in the electrolytic solution composition is 35 parts by weight.

Comparative Examples 3-1 to 3-8

Secondary batteries were fabricated in exactly the same manners as in Examples 3-1 to 3-8, respectively, except for using amorphous calcium having a specific surface area as determined by the BET method in the range of from 1.0 m2/g to 2.0 m2/g.

[Evaluation of Battery]
(a) Measurement of Capacity Retention Rate after 600 Cycles
(b) Measurement of Capacity Retention Rate after 300 Cycles of Overcharge As for the fabricated secondary batteries of the Examples and Comparative Examples, the evaluations (a) and (b) were performed in the same manners as in Example 1.

The measurement results are shown in the following Table 4.

TABLE 4

| | Cladding component | | | | Electrolytic solution composition | | | | | | Capacity retention rate after 600 cycles [%] | Capacity retention rate after 300 cycles of overcharge [%] |
|---|---|---|---|---|---|---|---|---|---|---|---|---|
| | Material | Shape of cladding component | Particle size [μm] | Specific surface area [m²/g] | EC [wt %] | PC [wt %] | DMC [wt %] | MEC [wt %] | FEC [wt %] | DFEC [wt %] | | |
| Example 3-1 | CaCO₃ | Cubic or rectangular parallelepipedal | — | 1 to 2 | 30 | 5 | 60 | 5 | 0 | 0 | 71 | 77 |
| Example 3-2 | CaCO₃ | Cubic or rectangular parallelepipedal | — | 1 to 2 | 29 | 5 | 60 | 5 | 1 | 0 | 74 | 80 |
| Example 3-3 | CaCO₃ | Cubic or rectangular parallelepipedal | — | 1 to 2 | 25 | 5 | 60 | 5 | 5 | 0 | 75 | 81 |
| Example 3-4 | CaCO₃ | Cubic or rectangular parallelepipedal | — | 1 to 2 | 20 | 5 | 60 | 5 | 10 | 0 | 76 | 82 |
| Example 3-5 | CaCO₃ | Cubic or rectangular parallelepipedal | — | 1 to 2 | 10 | 5 | 60 | 5 | 20 | 0 | 76 | 83 |
| Example 3-6 | CaCO₃ | Cubic or rectangular parallelepipedal | — | 1 to 2 | 0 | 5 | 60 | 5 | 30 | 0 | 75 | 82 |
| Example 3-7 | CaCO₃ | Cubic or rectangular parallelepipedal | — | 1 to 2 | 0 | 0 | 60 | 5 | 35 | 0 | 72 | 78 |
| Example 3-8 | CaCO₃ | Cubic or rectangular parallelepipedal | — | 1 to 2 | 20 | 5 | 60 | 5 | 0 | 10 | 76 | 81 |
| Comparative Example 3-1 | CaCO₃ | — | — | 1 to 2 | 30 | 5 | 60 | 5 | 0 | 0 | 56 | 65 |
| Comparative Example 3-2 | CaCO₃ | — | — | 1 to 2 | 29 | 5 | 60 | 5 | 1 | 0 | 58 | 67 |

TABLE 4-continued

| | Cladding component | | | Electrolytic solution composition | | | | | | Capacity retention rate after 600 cycles [%] | Capacity retention rate after 300 cycles of overcharge [%] |
| --- | --- | --- | --- | --- | --- | --- | --- | --- | --- | --- | --- |
| | Material | Shape of cladding component | Particle size [µm] | Specific surface area [m²/g] | EC [wt %] | PC [wt %] | DMC [wt %] | MEC [wt %] | FEC [wt %] | DFEC [wt %] | | |
| Comparative Example 3-3 | CaCO₃ | — | — | 1 to 2 | 25 | 5 | 60 | 5 | 5 | 0 | 60 | 69 |
| Comparative Example 3-4 | CaCO₃ | — | — | 1 to 2 | 20 | 5 | 60 | 5 | 10 | 0 | 63 | 72 |
| Comparative Example 3-5 | CaCO₃ | — | — | 1 to 2 | 10 | 5 | 60 | 5 | 20 | 0 | 60 | 70 |
| Comparative Example 3-6 | CaCO₃ | — | — | 1 to 2 | 0 | 5 | 60 | 5 | 30 | 0 | 58 | 69 |
| Comparative Example 3-7 | CaCO₃ | — | — | 1 to 2 | 0 | 0 | 60 | 5 | 35 | 0 | 55 | 66 |
| Comparative Example 3-8 | CaCO₃ | — | — | 1 to 2 | 20 | 5 | 60 | 5 | 0 | 10 | 62 | 71 |

In comparison of Examples 3-1 to 3-8 with Comparative Examples 3-1 to 3-8, it was noted that by incorporating calcium carbonate having a primary particle size in the longitudinal direction of not more than 5.0 µm into the positive electrode, a favorable cycle characteristic is obtainable regardless of the composition of the electrolytic solution.

While the present application has been described with reference to the embodiments and working examples, it should not be construed that the present application is limited to the foregoing embodiments and working examples, but various modifications can be made. For example, while the secondary battery having a wound structure has been described in the foregoing embodiments and working examples, the present application is similarly applicable to secondary batteries having a structure in which a positive electrode and a negative electrode are folded or stacked. In addition, the present application is also applicable to secondary batteries of a so-called coin type, button type, rectangular type or laminated film type or the like.

Also, in the foregoing embodiments and working examples, while the case of using a nonaqueous electrolytic solution has been described, the present application is also applicable to the case of using a nonaqueous electrolyte in any form. Examples of the nonaqueous electrolyte in other form include a nonaqueous electrolyte in a so-called gel form in which a nonaqueous solvent and an electrolyte salt are held in a polymer compound.

Furthermore, in the foregoing embodiments and working examples, while a so-called lithium ion secondary battery in which the capacity of a negative electrode is expressed by a capacity component due to intercalation and deintercalation of lithium has been described, the present application is also applicable to a so-called lithium metal secondary battery in which a lithium metal is used for a negative electrode active material, and the capacity of the negative electrode is expressed by a capacity component due to deposition and dissolution of lithium; or a secondary battery in which by making the charge capacity of a negative electrode material capable of intercalating and deintercalating lithium smaller than the charge capacity of a positive electrode, the capacity of a negative electrode includes a capacity component due to intercalation and deintercalation of lithium and a capacity component due to deposition and dissolution of lithium and is expressed by a total sum thereof.

Also, in the foregoing embodiments and working examples, while a battery using lithium as an electrode reactant has been described, the present application is also applicable to the case of using other alkali metal such as sodium (Na) and potassium (K), an alkaline earth metal such as magnesium and calcium (Ca), or other light metal such as aluminum.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A positive electrode comprising:
a positive electrode collector including aluminum; and
a positive electrode active material layer provided on the positive electrode collector and containing a positive electrode active material and an alkaline earth metal carbonate selected from the group consisting of calcium carbonate, magnesium carbonate and barium carbonate, wherein the alkaline earth metal carbonate has a primary particle size in the longitudinal direction of 0.01 µm or more and not more than 3.0 µm, and wherein a content of the alkaline earth metal carbonate in the positive electrode active material layer is 0.01% by weight or more and less than 0.1% by weight.

2. The positive electrode according to claim 1, wherein the alkaline earth metal carbonate has at least one shape selected from the group consisting of a cubic shape, a rectangular parallelepipedal shape, a spindle shape, a spherical shape and a flaky shape.

3. A nonaqueous electrolyte battery comprising:
a positive electrode including a positive electrode collector including aluminum, and a positive electrode active material layer provided on the positive electrode collector and containing a positive electrode active material and an alkaline earth metal carbonate selected from the group consisting of calcium carbonate, magnesium carbonate and barium carbonate, wherein the alkaline earth metal carbonate has a primary particle size in the longitudinal direction of 0.01 µm or more and not more than 3.0 µm, and wherein a content of the alkaline earth metal carbonate in the positive electrode active material layer is 0.01% by weight or more and less than 0.1% by weight;
a negative electrode;

a nonaqueous electrolyte; and a separator.

4. The nonaqueous electrolyte battery according to claim 3, wherein the alkaline earth metal carbonate has at least one shape selected from the group consisting of a cubic shape, a rectangular parallelepipedal shape, a spindle shape, a spherical shape and a flaky shape.

5. The nonaqueous electrolyte battery according to claim 3, wherein an open circuit voltage in a completely charged state per pair of the positive electrode and the negative electrode is 4.25 V or more and not more than 6.00 V.

6. The nonaqueous electrolyte battery according to claim 3, wherein the nonaqueous electrolyte contains 0.01% by weight or more and not more than 30% by weight of a halogen atom-containing cyclic carbonate derivative.

7. The nonaqueous electrolyte battery according to claim 6, wherein the halogen atom-containing cyclic carbonate derivative is at least one of 4-fluoro-1,3-dioxolan-2-one and 4,5-difluoro-1,3-dioxolan-2-one.

* * * * *